US008101812B2

(12) United States Patent
Fan et al.

(10) Patent No.: US 8,101,812 B2
(45) Date of Patent: *Jan. 24, 2012

(54) EXTRACTION OF HYDROCARBONS FROM HYDROCARBON-CONTAINING MATERIALS

(75) Inventors: Liang-tseng Fan, Manhattan, KS (US); Mohammad Reza Shafie, Manhattan, KS (US)

(73) Assignee: Green Source Energy LLC, The Woodlands, TX (US)

( * ) Notice: Subject to any disclaimer, the term of this patent is extended or adjusted under 35 U.S.C. 154(b) by 791 days.

This patent is subject to a terminal disclaimer.

(21) Appl. No.: 12/053,126

(22) Filed: Mar. 21, 2008

(65) Prior Publication Data

US 2009/0078612 A1 Mar. 26, 2009

Related U.S. Application Data

(60) Provisional application No. 60/973,964, filed on Sep. 20, 2007.

(51) Int. Cl.
*C07C 7/20* (2006.01)

(52) U.S. Cl. ........ 585/867; 585/833; 585/835; 585/836; 585/838; 166/279; 166/304

(58) Field of Classification Search .................. None
See application file for complete search history.

(56) References Cited

U.S. PATENT DOCUMENTS

| | | | |
|---|---|---|---|
| 2,191,767 A | 2/1940 | McCluer et al. | |
| 2,324,980 A | 7/1943 | Kilbourne | |
| 2,356,254 A | 8/1944 | Lehmann, Jr. et al. | |
| 2,549,438 A | 4/1951 | De Groote | |
| 3,061,097 A | 10/1962 | Dering et al. | |
| 3,279,541 A | 10/1966 | Knox et al. | |
| 3,288,215 A | 11/1966 | Townsend et al. | |
| 3,363,690 A | 1/1968 | Fischer | |
| 3,437,146 A * | 4/1969 | Everhart Ret al. | 166/303 |
| 3,724,553 A | 4/1973 | Snavely et al. | |
| 3,855,069 A | 12/1974 | Hess et al. | |
| 3,865,187 A | 2/1975 | Carlin et al. | |
| 3,881,551 A | 5/1975 | Terry et al. | |
| 3,909,390 A | 9/1975 | Urban | |
| 3,993,555 A | 11/1976 | Park et al. | |
| 4,011,153 A | 3/1977 | Fu | |
| 4,021,329 A | 5/1977 | Seitzer | |
| 4,028,219 A | 6/1977 | Baldwin et al. | |
| 4,029,567 A | 6/1977 | Farnand et al. | |
| 4,060,479 A | 11/1977 | Barcellos | |
| 4,094,770 A | 6/1978 | Bose | |
| 4,104,205 A | 8/1978 | Novotny et al. | |
| 4,108,760 A | 8/1978 | Williams et al. | |
| 4,154,301 A | 5/1979 | Carlin et al. | |
| 4,191,630 A | 3/1980 | Morrell | |
| 4,216,828 A | 8/1980 | Blair | |
| 4,260,019 A | 4/1981 | Blair, Jr. | |
| 4,273,191 A | 6/1981 | Hradel | |
| 4,337,828 A | 7/1982 | Blair, Jr. | |
| 4,338,183 A | 7/1982 | Gatsis | |
| 4,341,265 A | 7/1982 | Blair, Jr. | |
| 4,374,023 A | 2/1983 | Davis | |
| 4,381,035 A | 4/1983 | Hradel | |
| 4,389,300 A | 6/1983 | Mitchell | |
| 4,396,491 A | 8/1983 | Stiller et al. | |
| 4,401,551 A | 8/1983 | Mitchell | |
| 4,409,362 A | 10/1983 | Bzdula et al. | |
| 4,419,214 A | 12/1983 | Balint et al. | |
| 4,438,816 A | 3/1984 | Urban et al. | |
| 4,443,323 A | 4/1984 | Horikoshi et al. | |
| 4,448,589 A | 5/1984 | Fan et al. | |
| 4,461,696 A | 7/1984 | Bock et al. | |
| 4,485,007 A | 11/1984 | Tam et al. | |
| 4,485,869 A | 12/1984 | Sresty et al. | |
| 4,485,871 A | 12/1984 | Davis | |
| 4,502,950 A | 3/1985 | Ikematsu et al. | |
| 4,505,808 A | 3/1985 | Brunner et al. | |
| 4,511,488 A | 4/1985 | Matta | |
| 4,532,024 A | 7/1985 | Haschke et al. | |
| 4,533,460 A | 8/1985 | Ho | |
| 4,539,093 A | 9/1985 | Friedman et al. | |
| 4,541,916 A | 9/1985 | Beuther et al. | |
| 4,576,708 A | 3/1986 | Oko et al. | |
| 4,592,831 A | 6/1986 | Rhoe et al. | |
| 4,640,767 A | 2/1987 | Zajic et al. | |
| 4,650,496 A | 3/1987 | Funk | |
| 4,659,498 A | 4/1987 | Stoufer | |
| 4,663,059 A | 5/1987 | Ford et al. | |
| 4,673,133 A | 6/1987 | Datta et al. | |

(Continued)

FOREIGN PATENT DOCUMENTS

DE            108364       12/1897

(Continued)

OTHER PUBLICATIONS

Anabtawi, M. Z. A., et al., "Utilisation of shale oil by the extraction and retorting of oil shale", International Journal of Environmental Technology and Management, 2004, vol. 4, No. 3, pp. 199-207.
Butler, R. M., et al., "Closed-loop Extraction Method for the Recovery of Heavy Oils and Bitumens Underlain by Aquifers: the Vapex Process", The Journal of Canadian Petroleum Technology, Apr. 1998, vol. 37, No. 4, pp. 41-50.
Das, Swapan K., et al., "Extraction of Heavy Oil and Bitumen Using Vaporized Hydrocarbon Solvents", Petroleum Science and Technology, 1997, 15(1&2):51-75.
Herrera, C., "Evaluation of Solvents and Methods of Extraction", Transportation Research Board, Texas Department of Transportation, 1996, 22 pgs. (Abstract).
Kabadi, Vinayak N., "A Study of the Effects of Enhanced Oil Recovery Agents on the Quality of Strategic Petroleum Reserves Crude Oil", Final Technical Report, Oct. 1992, 32 pgs.
Karsilayan, H. et al., "The increase of Efficiency OP Pine Oil by Heating and Usage in the Flotation of Oxidized Ahasra Coal", 1992, (Abstract).
Lewis, A. E., Oil Shale Quarterly Report, Lawrence Livermore National Lab., Jan.-Mar. 1986, 15 pgs.
Martel, R., et al., "Aquifer Washing by Micellar Solutions: 1 Optimization of Alcohol-Surfactant-Solvent Solutions", Journal of Contaminant Hydrology, 1998, 29:319-346 (Abstract).

(Continued)

*Primary Examiner* — Tam M Nguyen
(74) *Attorney, Agent, or Firm* — Rothwell, Figg, Ernst & Manbeck, P.C.

(57) ABSTRACT

Solvents and methods are provided for extracting a hydrocarbon fraction from a solid, semi-solid, liquid or viscous liquid hydrocarbon-containing material.

31 Claims, No Drawings

U.S. PATENT DOCUMENTS

| | | | |
|---|---|---|---|
| 4,719,008 A | 1/1988 | Sparks et al. |
| 4,746,420 A | 5/1988 | Darian et al. |
| 4,765,885 A | 8/1988 | Sadeghi et al. |
| 4,772,379 A | 9/1988 | Gomberg |
| 4,814,094 A | 3/1989 | Blair, Jr. et al. |
| 4,842,715 A | 6/1989 | Paspek, Jr. et al. |
| 4,856,587 A | 8/1989 | Nielson |
| 4,891,131 A | 1/1990 | Sadeghi et al. |
| RE33,210 E | 5/1990 | Stoufer |
| 4,929,341 A | 5/1990 | Thirumalachar et al. |
| 4,968,413 A | 11/1990 | Datta et al. |
| 4,971,151 A | 11/1990 | Sheehy |
| 5,017,281 A | 5/1991 | Sadeghi et al. |
| 5,031,648 A | 7/1991 | Lutener et al. |
| 5,053,118 A | 10/1991 | Houser |
| 5,120,900 A | 6/1992 | Chen et al. |
| 5,234,577 A | 8/1993 | Van Slyke |
| 5,244,566 A | 9/1993 | Bond |
| 5,284,625 A | 2/1994 | Isayev et al. |
| 5,328,518 A | 7/1994 | Hamilton et al. |
| 5,362,316 A | 11/1994 | Paradise |
| 5,362,759 A | 11/1994 | Hunt et al. |
| 5,454,878 A | 10/1995 | Bala et al. |
| 5,489,394 A | 2/1996 | Ford et al. |
| 5,490,531 A | 2/1996 | Bala et al. |
| 5,492,828 A | 2/1996 | Premuzic et al. |
| 5,534,136 A | 7/1996 | Rosenbloom |
| 5,547,925 A | 8/1996 | Duncan, Jr. |
| 5,549,839 A | 8/1996 | Chandler |
| 5,559,085 A | 9/1996 | Duncan, Jr. |
| 5,587,354 A | 12/1996 | Duncan, Jr. |
| 5,602,186 A | 2/1997 | Myers et al. |
| 5,676,763 A | 10/1997 | Salisbury et al. |
| 5,677,354 A | 10/1997 | Oliveira Da Cunha Lima |
| 5,780,407 A | 7/1998 | Van Slyke |
| 5,788,781 A | 8/1998 | Van Slyke |
| 5,811,607 A | 9/1998 | Richardt et al. |
| 5,814,594 A | 9/1998 | Vlasblom |
| 5,853,563 A | 12/1998 | Ripley et al. |
| 5,858,247 A | 1/1999 | Campbell |
| 5,863,881 A | 1/1999 | Vlasblom |
| 5,877,133 A | 3/1999 | Good |
| 5,891,926 A | 4/1999 | Hunt et al. |
| 5,925,182 A | 7/1999 | Patel et al. |
| 5,968,349 A | 10/1999 | Duyvesteyn et al. |
| 5,985,816 A | 11/1999 | Vlasblom |
| 5,998,640 A | 12/1999 | Haefele et al. |
| 6,013,158 A | 1/2000 | Wootten |
| 6,051,535 A | 4/2000 | Bilden et al. |
| 6,090,769 A | 7/2000 | Vlasblom |
| 6,093,689 A | 7/2000 | Vlasblom |
| 6,120,680 A | 9/2000 | Campbell |
| 6,173,776 B1 | 1/2001 | Furman et al. |
| 6,197,734 B1 | 3/2001 | Vlasblom |
| 6,211,133 B1 | 4/2001 | Chesky |
| 6,228,830 B1 | 5/2001 | Vlasblom |
| 6,235,698 B1 | 5/2001 | Vlasblom |
| 6,248,396 B1 | 6/2001 | Helf |
| 6,260,620 B1 | 7/2001 | Furman et al. |
| 6,289,989 B1 | 9/2001 | Mueller et al. |
| 6,310,263 B1 | 10/2001 | Vlasblom |
| 6,319,395 B1 | 11/2001 | Kirkbride et al. |
| 6,369,016 B1 | 4/2002 | Vlasblom |
| 6,380,269 B1 | 4/2002 | Benko et al. |
| 6,416,705 B1 | 7/2002 | Dinzburg et al. |
| 6,479,558 B1 | 11/2002 | Fliermans |
| 6,534,449 B1 | 3/2003 | Gilmour et al. |
| 6,541,526 B1 | 4/2003 | Goldshtein et al. |
| 6,543,535 B2 | 4/2003 | Converse et al. |
| 6,564,869 B2 | 5/2003 | McKenzie et al. |
| 6,590,042 B1 | 7/2003 | Tang |
| 6,593,279 B2 | 7/2003 | Von Krosigk et al. |
| 6,709,573 B2 | 3/2004 | Smith |
| 6,797,684 B2 | 9/2004 | Henneberry et al. |
| 6,803,347 B1 | 10/2004 | Ladva et al. |
| 6,831,109 B1 | 12/2004 | Beirakh et al. |
| 6,858,090 B2 | 2/2005 | Hebert |
| 6,872,754 B1 | 3/2005 | Wortham |
| 6,924,319 B1 | 8/2005 | Alsdorf et al. |
| 6,936,159 B1 | 8/2005 | Kean |
| 6,992,116 B2 | 1/2006 | Benko et al. |
| 7,188,676 B2 | 3/2007 | Qu et al. |
| 7,192,912 B2 | 3/2007 | Laux |
| 7,198,103 B2 | 4/2007 | Campbell |
| 7,231,976 B2 | 6/2007 | Berry et al. |
| 7,311,838 B2 | 12/2007 | Herold et al. |
| 7,316,273 B2 | 1/2008 | Nguyen |
| 7,334,641 B2 | 2/2008 | Castellano |
| 7,392,844 B2 | 7/2008 | Berry et al. |
| 7,392,845 B2 | 7/2008 | Berry et al. |
| 7,481,273 B2 | 1/2009 | Javora et al. |
| 2003/0024703 A1 | 2/2003 | McKenzie et al. |
| 2003/0166472 A1 | 9/2003 | Pursley et al. |
| 2003/0213747 A1 | 11/2003 | Carbonell et al. |
| 2005/0161372 A1 | 7/2005 | Colic |
| 2005/0197267 A1 | 9/2005 | Zaki et al. |
| 2006/0035793 A1 | 2/2006 | Goldman |
| 2006/0042796 A1 | 3/2006 | Qu et al. |
| 2006/0065396 A1 | 3/2006 | Dawson et al. |
| 2006/0113218 A1 | 6/2006 | Hart et al. |
| 2006/0142172 A1 | 6/2006 | Cioletti et al. |
| 2007/0039732 A1 | 2/2007 | Dawson et al. |
| 2007/0095753 A1 | 5/2007 | Carbonell et al. |
| 2007/0125686 A1 | 6/2007 | Zheng et al. |
| 2007/0251693 A1 | 11/2007 | Cheramie et al. |
| 2007/0254815 A1 | 11/2007 | Cheramie et al. |
| 2008/0047876 A1 | 2/2008 | Keller |
| 2008/0073079 A1 | 3/2008 | Tranquilla et al. |
| 2008/0139418 A1 | 6/2008 | Cioletti et al. |
| 2008/0139678 A1 | 6/2008 | Fan et al. |
| 2008/0169222 A1 | 7/2008 | Ophus |
| 2008/0173447 A1 | 7/2008 | Da Silva et al. |
| 2008/0190818 A1 | 8/2008 | Dana et al. |
| 2008/0207981 A1 | 8/2008 | Hoag et al. |
| 2008/0249348 A1 | 10/2008 | Keller |
| 2008/0253840 A1 | 10/2008 | Shiau |
| 2008/0296024 A1 | 12/2008 | Huang et al. |

FOREIGN PATENT DOCUMENTS

| | | |
|---|---|---|
| DE | 277602 | 2/1913 |
| DE | 374929 | 11/1918 |
| DE | 718585 | 4/1939 |
| DE | 682440 | 9/1939 |
| DE | 922713 | 5/1952 |
| DE | 2613122 A1 | 10/1976 |
| EP | 0391651 A2 | 10/1990 |
| EP | 0588865 B1 | 3/1994 |
| FR | 2828064 A1 | 2/2003 |
| GB | 108339 | 7/1917 |
| GB | 108448 | 7/1917 |
| GB | 120558 | 11/1919 |
| GB | 249519 | 6/1927 |
| GB | 322749 | 12/1929 |
| GB | 617869 | 2/1949 |
| GB | 672817 | 5/1952 |
| GB | 1311889 A | 3/1973 |
| GB | 2001670 A | 2/1979 |
| JP | 9165582 A | 6/1997 |
| JP | 2005105012 A | 4/2005 |
| NL | 7316416 A | 6/1975 |
| RU | 1816791 A1 | 5/1993 |
| RU | 1824418 A1 | 6/1993 |
| WO | WO 8402145 A1 | 6/1984 |
| WO | WO 9517244 A1 | 6/1995 |
| WO | WO 9920409 A1 | 4/1999 |
| WO | WO 9953764 A2 | 10/1999 |
| WO | WO 2005091771 A2 | 10/2005 |
| WO | WO 2006039772 A2 | 4/2006 |
| WO | WO 2007005944 A2 | 1/2007 |
| WO | WO 2007112254 A2 | 10/2007 |
| WO | WO 2008061304 A1 | 5/2008 |

OTHER PUBLICATIONS

Oliveira, M. C. K., et al., "Heavy Oil Fraction Removal From Sand Using Hydrotropes Containing Oil-in-Water Microemulsions", Progress in Colliod and Polymer Science, 2004, 288-292 (Abstract).

Popova, Inna E., et al., "Efficient Extraction of Fuel Oil Hydrocarbons from Wood", Separation Science and Technology, 2008, 43:778-793.

Salama, D., et al., "Experimental Observations of Miscible Displacement of Heavy Oils With Hydrocarbon Solvents", International Thermal Operations and Heavy Oil Symposium, 2005, pp. 1-8.

Sarkar, G. G., et al., "Selectivity of Coal Macerals During Flotation and Oil Agglomeration: A Case Study", International Journal of Coal Preparation and Utilization, 1984, 1(1):39-52 (Abstract).

Wen, Y., et al., "Evaluation of Bitumen-Solvent Properties Using Low Field NMR", Journal of Canadian Petroleum Technology, 2005, vol. 44, No. 4, pp. 22-28.

Wilkins, R. W. T., et al., "Coal As a Source Rock for Oil: A Review", International J. Coal Geology, 2002, 50:317-361 (Abstract).

"Test Method to Determine the Bitumen Content of Slurry Seal Mixture", Georgia Department of Transportation, Jan. 2007, 2 pgs.

Ullmann's Encyclopedia of Industrial Chemistry, Sixth, Completely Revised Edition, vol. 37, p. 565 (2003).

Arso, A. and M. Iino, "Effect of amines added on Banko coal liquefaction," Fuel Processing Technology, 2007, pp. 813-816, vol. 88.

Ahmed, Tarek. "Reservoir Engineering Handbook," Fourth Edition, 2010, p. 960-972, Elsevier, Inc., Burlington, Massachusetts.

* cited by examiner

EXTRACTION OF HYDROCARBONS FROM HYDROCARBON-CONTAINING MATERIALS

CROSS REFERENCE TO RELATED APPLICATION

The present application claims benefit of U.S. provisional application 60/973,964, filed Sep. 20, 2007.

FIELD OF THE INVENTION

The present invention relates to the field of extraction of hydrocarbons from hydrocarbon-containing materials.

BACKGROUND OF THE INVENTION

The liquefaction, solubilization and/or extraction of fossil fuels in solid, semi-solid, viscous or highly viscous form, simply fossil fuels hereafter, have proven to be extremely challenging and thus difficult. Such fossils fuels include coal, oil shale, tar sands, crude oil and heavy crude oil, which contain organic matter as bitumen, kerogen, natural asphalt and/or asphaltene. This can be attributed to the fact that these fossil fuels comprise organic polymers of complex structures linked by oxygen and sulfur bonds, which are often imbedded in the matrices of inorganic compounds. An urgent and dire need exists to produce additional liquid feed stock for the manufacture of liquid and gaseous fuels as well as for various chemicals, pharmaceuticals and engineered materials: The demand and consumption for them are increasing very rapidly. Various technologies or processes have been invented to liquefy, solubilize and/or extract the fossil fuels. Nevertheless, none of liquefaction, solubilization and extraction technologies or processes has proven to be commercially viable on a large scale for all types of fossil fuels. This is due to the fact that every liquefaction, solubilization or extraction technology or process invented to date is exceedingly expensive to deploy and operate; moreover, such a technology or process is profoundly convoluted to scale up, operate and/or control because of one or more of the following reasons: (1) operating at an inordinately elevated pressure; (2) operating at a very high temperature; (3) needing to use expensive processing vessels and equipment requiring the external supply of hydrogen under extreme conditions; (4) being subjected to a mixture, or composition, of two or more reagents, catalysts and/or promoters, which are frequently highly toxic and are neither renewable nor recyclable; (5) requiring to supply a special form of energy, e.g., microwave radiation; (6) requiring an unusually long time even for partial liquefaction, solubilization or extraction; (7) requiring extraordinarily fine particles with a size of about 200 mesh (0.074 mm), which is profoundly difficult and costly to manufacture and handle; and (8) being incapable of recovering and recycling the necessary reagents, catalysts and/or promoters. Typical or well-known processes invented to date, all of which suffer from one or more of these major deficiencies, are outlined in the following.

German Pat. No. DE 2613122 19761014 (1976) discloses a process that causes liquefaction and desulfurization of finely divided coal suspended in a liquid tar or residual oil, in contact with H or synthesis gas and a catalyst such as Co—Mo/Al2O3 at 375-475°. Where synthesis gas is used, Na2CO3 may be used in combination with Co—Mo.

U.S. Pat. No. 4,021,329 (1977) discloses a process for dissolving sub-bituminous coal by heating said coal in the presence of a hydrogen donor oil, gaseous carbon monoxide, water, hydrogen, and an iron compound promoted with an alkali or alkali precursor at a temperature of from about 400 degree to about 425 degree C. and at a total pressure of from about 2000 to about 5000 psig.

U.S. Pat. No. 4,060,479 (1977) discloses a process for obtaining oil, gas, sulfur and other products from shale whereby there is effected drying, pyrolysis, gasification, combustion and cooling of pyrobituminous shale or similar rocks in a single passage of said shale continuously in a moving bed, the charge and discharge of the shale being intermittent and wherein the maximum temperature of the bed is maintained in the range of about 1050° C. to 1200° C. (1900° F. to 2200° F.) or higher. The shale is essentially completely freed from the organic matter, fixed carbon and sulfur, resulting in a clean solid residue which can be disposed of without harming the ecology.

U.S. Pat. No. 4,108,760 (1978) discloses an invention related to the extraction of oil shales and tar sands by using a solvent under supercritical conditions at a temperature within 200° C. or its critical temperature in order to effect extraction of kerogen from the sand or shale. In the case of shales considerable heat needs to be applied to the shale before effective extraction can occur and extraction in this case may be carried out at a temperature within the range of 370° to 450° C.

U.S. Pat. No. 4,191,630 (1980) discloses a continuous process to produce shale oil from oil shales. It comprises an improvement, the purpose of which is to remove relatively small and up to substantial amounts of the water present as steam; and to prevent pitch formation, and "stickiness" in a second or retorting stage of the process, carried out at a much higher temperature. The first step may consist of a fixed vertical vessel in one aspect of the process or alternately a much smaller rotating horizontal vessel than that used in the second step of the process. The first step is conducted at a temperature from ambient, preferably 212° F. up to 550° F. The second or retorting step is conducted at 800° F. to 1000° F. Indirect heating of the oil shales is employed in all cases.

U.S. Pat. No. 4,338,183 (1982) discloses a process in which a solid carbonaceous material, such as coal, is converted to liquid products and the asphaltene content of a heavy hydrocarbonaceous liquid is reduced. In the process, the solid is solvent extracted by the heavy hydrocarbonaceous liquid and a hydrocarbonaceous recycle stream with a finely divided, unsupported metal catalyst and the resultant mixture of liquids is recovered as the product.

U.S. Pat. No. 4,396,491 (1983) discloses a process for extracting oil shale or tar sands under non-thermally destructive conditions with a solvent liquid containing a compound having the general formula:

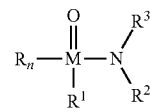

where M is a carbon, sulfur, or phosphorus atom, $R^2$ and $R^3$ are each a hydrogen atom or a lower alkyl group, R and $R^1$ are each a lower alkyl group, another

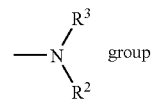

group a monocyclic aromatic group, or R¹ can be another

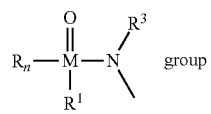 group or R¹ and R² together can represent the atoms necessary to close a heterocyclic ring, and n=1 where M=phosphorus and is otherwise 0, to substantially remove the non-fixed carbon content of the oil shale or tar sands, leaving a solid residue of fixed carbon, ash minerals, and non-extractable matter.

U.S. Pat. No. 4,419,214 (1983) discloses a method of recovering hydrocarbon substances such as oil and tar from naturally occurring mineral matter such as oil shale and young coal ranks, which comprises subjecting the natural mineral product to microwave irradiation in a pressure vessel through which an expelling medium is passed. The expelling medium can be gaseous or liquefied carbon dioxide containing natural or mixed gases, hydrocarbon-containing gas, vapor or liquid and gaseous or vapor-halogenated hydrocarbons.

U.S. Pat. No. 4,461,696 (1984) discloses a process for converting organic material of oil-shale to predominantly liquids. The oil-shale is first heated to a temperature from about 360° C. to 475° C. in an inert atmosphere. The resulting liquids and gases are collected and the residue is extracted with a microemulsion capable of extracting organic material from the heat treated oil-shale.

U.S. Pat. No. 4,443,323 (1984) discloses a process for the oil extraction from oil sand comprising: mixing oil sand, cyclodextrin, a hydrocarbon solvent, a flocculating agent and water with one another to prepare a suspension, leaving the suspension to stand or centrifuging it to separate into an oil, a water and a sand layer, and then collecting the oil layer.

U.S. Pat. No. 4,438,816 (1984) discloses a process for the recovery of hydrocarbonaceous oil from oil shale. The process comprises: (a) heating the shale in the presence of a non-combustion supporting, non oil-miscible gas at subcritical conditions of said gas and at a temperature from about 650° F. to about 825° F. to produce a solvent extractable material and to liberate at least a first portion of the hydrocarbon contained therein; and (b) contacting the resulting solvent extractable material with a normally-liquid solvent at subcritical, reflux conditions of said solvent to liberate at least a second portion of the hydrocarbon contained in said solvent extractable material.

U.S. Pat. No. 4,485,869 (1984) discloses a method of electromagnetic heating in situ to recover liquid hydrocarbons from an oil shale formation containing kerogen in an inorganic matrix where the formation is substantially impermeable to fluids under native conditions. A block of the oil shale formation is substantially uniformly heated in situ with electromagnetic power to a temperature of about 275° C. where there is pyrolysis of a portion of the kerogen to gas and shale oil at a pressure sufficient to overcome the capillary pressure of the shale oil in the matrix, thereby providing substantial fluid permeability to the formation. The gas thereupon escaping from said block and the shale oil driven thereby are recovered, thereby further increasing the permeability of the formation. The magnitude of the electromagnetic power is controlled to raise the temperature of the block relatively slowly to increase the rate of pyrolysis of the kerogen as the permeability of the formation increases to produce gas at pressures above the necessary to overcome the capillary pressure and below that at which there is substantial escape of the gas bypassing shale oil within the formation rather than driving the oil before it.

U.S. Pat. No. 4,541,916 (1985) discloses a process for converting coal to liquid hydrocarbonaceous products involving a liquefaction reaction in the presence of a coal derived recycle slurry and a non-coal derived solvent comprising a hydrocarbonaceous oil or distillation bottom residue thereof intrinsically contaminated with greater than 300 ppm total of vanadium and nickel. The liquefaction reaction is performed under hydrogen pressure (approximately 500-4000 psi) and under elevated temperature (approximately 300.degree.-500° C.) using a weight ratio of non-coal derived solvent to coal of about 1/1 or less. The conversion of coal to liquids is greatly enhanced by the use of such a non-coal derived solvent under these conditions.

U.S. Pat. No. 4,539,093 (1985) discloses a hydrocarbon extraction process and apparatus for removing hydrocarbons from a hydrocarbon containing ore such as a diatomite ore. The ore is preprocessed to the extent required to produce an extractable ore and subsequently mixed with a carrier to form an ore stream. The carrier may be a nonaqueous solvent and may further comprise a non-porous granular material such as sand. The ore stream is passed in substantially vertical countercurrent flow through a nonaqueous solvent to produce a product-solvent stream and a spent ore stream. The solvent is subsequently separated from the hydrocarbon stream, which may be further upgraded by removal of a heavy portion. This may be accomplished in the presence of a substantial amount of fines.

U.S. Pat. No. 4,533,460 (1985) discloses a process by which hydrocarbon liquids are recovered from oil shale and other solids containing organic matter by passing a liquid organic solvent downwardly through an extraction zone in contact with said solids at an elevated pressure sufficient to maintain said solvent in the liquid phase and at a temperature below about 900° F., preferably between about 650° F. and about 900° F., in order to extract hydrocarbons from the solids into the solvent. The extracted hydrocarbons are then recovered from the solvent by fractionation. Normally, heat is supplied to the extraction zone by passing a hot, nonoxidizing gas, preferably an oxygen-free gas generated within the process, downwardly through the extraction zone in cocurrent flow with the liquid organic solvent.

U.S. Pat. No. 4,772,379 (1988) discloses a new technology for the extraction of liquid hydrocarbon products from fossil fuel resources such as oil shale, tar sands, heavy oils and coals, which comprises the mixing of a donor solvent with the fossil fuel and the exposure of the mixture to ionizing radiation. The donor solvent supplies hydrogen for combination with molecules whose bonds are broken by the irradiation process. The method may be conducted at or above ambient temperatures and pressures.

U.S. Pat. No. 4,856,587 (1989) discloses an invention comprising a method and apparatus for recovering oil from so-called depleted oil fields and also from tar sands. A pressurized, heated, non-aqueous gas, such as carbon dioxide, is continuously flowed through a channel which is in heat exchange relationship with an oil-bearing matrix, thus reducing the viscosity and mobilizing the oil in the sensible boundary region. Mobilized oil flows to a collection reservoir from which it is then produced.

U.S. Pat. No. 4,929,341 (1990) discloses a process by which an oil bearing soil is contacted in a contacting zone with a liquid medium comprising water and a lipophilic solvent which is miscible or soluble with water. The medium can include a yield improving agent comprising a water soluble acidic ionic salt or a water soluble ionic acid. The contacting produces an emulsion which comprises the oil from the oil bearing soil and the liquid medium. The inorganic portion of the soil is dispersed in the emulsion and it is separated from the emulsion by gravity or other suitable means. The emulsion is broken by an emulsion breaking agent into two phases. The two phases are allowed to separate into two layers. The first layer comprises the oil and minor amounts of the liquid medium. The second layer comprises the liquid medium and minor amounts of the oil. The first layer is then recovered. The medium from the second layer can be recycled into the contacting zone.

U.S. Pat. No. 5,998,640 (1999) discloses a method and apparatus for continuously removing oil from oil-bearing solids such as tar sands, vegetables or other solid materials using a solvent. By providing a pressure differential between the exterior and interior of an oil extraction chamber, substantially oil free solids may be removed from the oil extraction chamber through a solids extraction channel without removing any substantial volume of solvent through the solids extraction channel.

U.S. Pat. No. 6,013,158 (2000) discloses an apparatus for forming liquid hydrocarbons from solid coal. The coal is pulverized to provide a particulate coal feed, which is then extruded to provide a hollow tube of compressed coal supported inside of a support tube. A clay feed is extruded to provide a hollow tube of compressed clay supported inside of the coal tube and a combustible fuel is burned inside of the clay tube. The temperature of combustion is sufficient to fire the extruded clay and pyrolyze the extruded coal to produce hydrocarbon gases and coal char. The support tube has holes for releasing the hydrocarbon gases, which contain suspended particles formed during combustion. The suspended particles are removed from the hydrocarbon gases to provide clean gases, which are passed through an ionizing chamber to ionize at least a portion thereof. The ionized gases are then passed through a magnetic field to separate them from each other according to their molecular weight. Selected portions of at least some of the separated gases are mixed, and the mixed gases are cooled to provide at least one liquid hydrocarbon product of predetermined composition. Portions of the separated gases may also be mixed with the coal char and other input streams, such as waste plastics, and further treated to provide other hydrocarbon products.

U.S. Pat. No. 6,319,395 (2001) discloses a continuous process for producing synthetic crude oil from oil bearing material, e.g., oil shale or tar sand, through continuous process for producing synthetic crude oil from bituminous tar sand or shale. The process includes treating the tar sand or shale to produce a fluidizable feed, feeding the fluidizable feed to a fluidized bed reactor, and fluidizing and reacting the fluidizable feed in the fluidized bed reactor with substantially only hydrogen at a temperature of at least 900° F.

U.S. Pat. No. 6,936,159 (2005) discloses a process for recovering hydrocarbons from coal or oil shale. The process involves the steps of forming a pulp of finely divided coal or oil shale in a first reaction bed, adding concentrated sulphuric acid to the first reaction bed, controlling the temperature of the first reaction bed to produce a hydrocarbon mixture, and deacidifying the hydrocarbon mixture.

One of the available technical articles ["Effects of Amines Added on Banko Coal Liquefaction," by A. Arso and M. Iino, in Fuel Processing Technology, Vol. 88, pp. 813-816 (2007)] reports the following. The addition of about 10 wt. % of an amine from aliphatic or aromatic amines to a 1-to-2 mixture of coal and tetralin substantially increases the degree of coal conversion, which can be as much as about 50 wt. % or more, when the direct liquefaction of coal with the size of about 200 mesh (74 μm or 0.074 mm) is carried out at temperatures in the range between 300 and 450° C. under the pressure of at least $90 \times 10^5$ (90 atm).

SUMMARY OF INVENTION

A method of liquefying, solubilizing and/or extracting hydrocarbon-containing organic matter from a hydrocarbon-containing material, such as a solid, semi-solid, sludge or slurry of a fossil fuel, e.g., coal, oil shale, tar sands, crude oil or heavy crude oil, or for example oil tank bottoms, oil pit or pond sludge, discarded foods, manure, sewage sludge or municipal garbage, comprising providing a turpentine liquid-containing fluid contacting said material with said turpentine liquid-containing fluid so as to extract said organic matter from said material into said turpentine liquid-containing fluid, and separating the extracted organic matter in the turpentine liquid-containing fluid from any residual material not extracted.

DETAILED DESCRIPTION OF THE PREFERRED EMBODIMENTS OF THE INVENTION

In preferred embodiments, the ratio of turpentine liquid to hydrocarbon-containing material is greater than or equal to about 1:4, more preferably greater than or equal to about 1:2, and most preferably greater than or equal to about 7:3.

In preferred embodiments, the minimum organic matter contained in the hydrocarbon-containing material is greater than or equal to about 1% by weight, more preferably greater than or equal to about 10% by weight, and most preferably greater than or equal to about 14% by weight of the hydrocarbon-containing material.

In preferred embodiments, the minimum amount of organic matter extracted from the hydrocarbon-containing material is greater than or equal to about 2% by weight, more preferably greater than or equal to about 10%, more preferably greater than or equal to about 20%, more preferably greater than or equal to about 30%, more preferably greater than or equal to about 40%, more preferably greater than or equal to about 50%, more preferably greater than or equal to about 60%, more preferably greater than or equal to about 70%, more preferably greater than or equal to about 80%, more preferably greater than or equal to about 90% or most preferably equal to about 100% by weight.

In the preferred embodiment of the invention, a liquefaction, solubilization or extraction reagent of choice for the fossil fuels, such as coal, oil shale, tar sands, crude oil and heavy crude oil, is natural or synthetic turpentine, both of which are rich in α-terpineol, or α-terpineol itself. The most preferred liquefaction, solubilization or extraction reagent is α-terpineol or synthetic turpentine.

It is preferred that the liquefaction, solubilization and/or extraction of fossil fuels be carried out at a temperature, which is within the range of about 2° C. to about 300° C. The most preferred liquefaction, solubilization and/or extraction temperatures are within the range of about 20° C. to about 200° C. The pressure under which is to be carried out will typically be within the range of about $1.0 \times 10^4$ Pascals (0.1 atm or 1.47 lbs/in$^2$) to about $5.0 \times 10^6$ Pascals (50.0 atm or 738 lbs/in$^2$). It is generally most preferred to carry out the process under a pressure within the range of about $5.0 \times 10^4$ Pascals (0.5 atm or 7.3 lbs/in$^2$) to about $8.0 \times 10^5$ Pascals (8.0 atm or 118 lbs/in$^2$). It is normally preferred that the fossil fuels to be liquefied, solubilized and/or extracted be immersed in one or more of the said liquefaction, solubilization and/or extraction reagents in the form of a bed of particles, pieces, chunks or blocks of fossil fuels whose sizes are within the range of about 0.074 mm (200 mesh) to about 100 mm in a liquefaction, solubilization or extraction vessel (reactor hereafter) that contains one or more of the said liquefaction, solubilization and/or extraction reagents; it is most preferred that the sizes of the particles, pieces, chunks or blocks of fossil fuels are within the range of about 0.149 mm (100 mesh) to about 20 mm. It is normally preferred that the bed of particles, pieces, chunks or blocks of fossil fuels is agitated by passing the liquefaction, solubilization and/or extraction reagent or reagents in the form of liquid through the bed of particles, pieces, chunks or blocks by boiling the reagent or reagents. It is preferred that the duration of liquefaction, solubilization and/or extraction be within about 1 minute to about 90 minutes. The fossil fuels is partially or fully liquefied, solubilized and/or extracted; the degree of liquefaction, solubilization and/or extraction can be effected by controlling the operating conditions, such as temperature, pressure, intensity of agitation and duration of operation, and/or adjusting the type, relative amount and concentration of the liquefaction, solubilization or extraction reagent or reagents in the reactor.

The basis of the present invention is the totally unexpected discovery that when about 500 grams of the reagent, α-terpineol, were added to about 250 grams of the 60-mesh sample of coal from the Pittsburgh seam in Washington County of Pennsylvania in a tray, the reagent's color almost immediately turned pitch black and remained so after several hours. This indicated that the color change was not due to the suspension of the coal particles. Subsequently, this 2-to -1 mixture of α-terpineol and the coal sample was transferred from the tray to a capped and tightly sealed jar; it was maintained under the ambient conditions of about 20° C. and slightly less than about $1.01 \times 10^5$ Pascals (1 atm) for about 25 days. The conversion, i.e., the degree of liquefaction, of the coal sample was determined to be about 71 wt. % after filtering, washing with ethanol, drying, and weighing. This 71 wt. % corresponds to nearly all the solubilizable bitumen (organic matter) in the coal sample whose proximate analyses are 2.00 wt. % of as-received moisture, 9.25 wt. % of dry ash, 38.63 wt. % of dry volatile matter, and 50.12 wt. % of dry fixed carbon. A series of subsequent experiments with coal as well as oil shale and tar sands under various operating conditions has shown that the family of reagents, comprising natural and/or synthetic turpentines containing pinenes, and alcohols of pinene, i.e., terpineols, are inordinately effective in liquefying, solubilizing and/or extracting kerogen (organic matter), bitumen (organic matter) and/or asphaltene (organic matter) in the fossil fuels, including coal, oil shale, tar sands, crude oil and/or heavy crude oil, without the aid of any catalyst or alkaline metals. These reagents, except mineral turpentine from petroleum, are renewable and "green," i.e., low in toxicity, and relatively inexpensive, compared to all other known liquefaction, solubilization and/or extraction reagents for the fossil fuels, such as tetraline, xylene, anthracene, and various solutions or mixtures of these reagents with other compounds. Even the mineral turpentine from petroleum, although not renewable, is relatively low in toxicity and is inexpensive. It was found that any of the said liquefaction, solubilization and/or extraction reagents penetrates or diffuses into the particles, pieces, blocks or chunks of fossil fuels through their pores at appreciable rates, thus causing these particles, pieces, chunks or blocks to subsequently release the liquefiable, solubilizable or extractable fraction in them often almost nearly completely even under the far milder conditions, e.g., ambient temperature and pressure, than those required by the recent inventions pertaining to the liquefaction, solubilization and/or extraction of the fossil fuels, such as coal, oil shale, tar sands, crude oil and heavy crude oil.

An aspect of the present invention provides a method of liquefying, solubilizing and/or extracting the fossil fuels, such as coal, oil shale and tar sands, wherein a portion of solid or semi-solid fossil fuels is contacted with a turpentine liquid in a reaction mixture, which may be in an absence of an alkali metal, catalyst, hydrogen ($H_2$) and/or carbon monoxide (CO).

According to a preferred aspect of the present invention, the turpentine liquid is any one or more liquids selected from the group consisting of natural turpentine, synthetic turpentine, mineral turpentine, pine oil, α-pinene, β-pinene, α-terpineol, β-terpineol, 3-carene, anethole, dipentene (p-mentha-1,8-diene), terpene resins, nopol, pinane, camphene, p-cymene, anisaldeyde, 2-pinane hydroperoxide, 3,7-dimethyl-1,6-octadiene, isobornyl acetate, terpin hydrate, ocimene, 2-pinanol, dihydromycenol, isoborneol, α-terpineol, alloocimene, alloocimene alcohols, geraniol, 2-methoxy-2,6-dimethyl-7,8-epoxyoctane, camphor, p-menthan-8-ol, α-terpinyl acetate, citral, citronellol, 7-methoxydihydrocitronellal, 10-camphorsulphonic acid, p-menthan-8-yl acetate, cintronellal, 7-hydroxydihydrocitronellal, menthol, menthone, polymers thereof, and mixtures thereof.

According to an aspect of the present invention, the solid or semi-solid fossil fuels, such as coal, oil shale, tar sands and heavy crude oil, or for example oil tank bottoms, oil pit or pond sludge, discarded foods, manure, sewage sludge or municipal garbage, may be provided in any size that facilitates contact with a turpentine liquid. The fossil fuels may be provided as particles, pieces, chunks, or blocks, for example, large fragments or pieces of coal or oil shale. According to a preferred aspect of the invention, the fossil fuel is provided as particles. According to a preferred aspect of the invention, the particles of fossil fuel have an average particle size of from about 0.074 millimeters to about 100 millimeters.

According to an aspect of the present invention, the turpentine liquid-containing fluid further comprises a solvent. According to a preferred aspect of the invention, the solvent is selected from the group consisting of lower aliphatic alcohols, lower alkanes, lower aromatics, aliphatic amines, aromatic amines, carbon bisulfide and mixtures thereof. Examples of these mixtures are the solvents manufactured in petroleum refining, such as decant oil, light cycle oil and naphtha, or the solvents manufactured in dry distilling coal and fractionating liquefied coal. According to a preferred aspect, the solvent is selected from the group consisting of ethanol, propanol, isopropanol, butanol, pentane, heptane, hexane, benzene, toluene, xylene, anthracene, tetraline, triethylamine, aniline, carbon bisulfide, and mixtures thereof.

In preferred embodiments, the ratio of turpentine liquid to any other turpentine-miscible solvent contained in said fluid preferably is greater than or equal to 1:1, more preferably greater than or equal to about 9.4.

According to an aspect of the present invention, the fossil fuel and the turpentine liquid are contacted at a temperature of from about 2° C. to about 300° C. More preferably, the fossil fuel is contacted by the turpentine liquid at a temperature of less than 200° C.

According to a further aspect of the present invention, the fossil fuel and the turpentine liquid are contacted at a pressure of from about $1.0 \times 10^4$ Pascals (0.1 atm) to about $5.0 \times 10^6$ Pascals (50 atm). According to an aspect, the method is executed at a pressure of from about 0.5 atm to about 8 atm.

According to an aspect of the present invention, the method further comprises providing a reactor vessel within which the solid or semi-solid fossil fuel is contacted with the turpentine liquid. According to an aspect, agitation means is provided whereby the fossil fuel and the turpentine liquid contained within the reactor or extractor vessel are mixed and agitated.

According to an aspect of the present invention, the fossil fuel and turpentine liquid are incubated in a holding tank so as to prolong their time of contact. According to a further aspect, the degree of liquefaction, solubilization and/or extraction is controlled by the length of time the solid or semi-solid fossil fuel is in contact with the turpentine liquid and/or the temperature of the mixture of the fossil fuel and turpentine liquid.

According to an aspect of the present invention, the fossil fuel is contacted with a heterogeneous liquid comprising a turpentine liquid and water as an agitant.

In preferred embodiments, the ratio of turpentine liquid-containing fluid to water is greater than or equal to about 1:1 by volume, to avoid slurry formation which may render separation of the extracted organic matter in the turpentine liquid-containing fluid difficult.

According to an aspect of the present invention, the fossil fuel is contacted by the turpentine liquid in the presence of an energy input selected from the group consisting of thermal energy in excess of about 300° C., pressure in excess of 50 atm, microwave energy, ultrasonic energy, ionizing radiation energy, mechanical shear-forces, and mixtures thereof.

According to an aspect of the present invention, a liquefaction or solubilization catalyst is provided to the mixture of fossil fuel and turpentine liquid.

According to an aspect of the present invention, the reaction or solubilization mixture is supplemented by the addition of a compound selected from the group consisting of hydrogen, carbon monoxide, water, metal oxides, metals, and mixtures thereof.

According to an aspect of the present invention, it can be deployed readily in-situ to liquefy and/or solubilize directly the fossil fuels, such as coal, oil shale, tar sands, crude oil and heavy crude oil, in underground formations and extract the resulting liquid products from such formations.

According to an aspect of the present invention, a microorganism is included in the reaction or solubilization mixture. Select chemical bonds, for example, sulfur cross-links and oxygen cross-links, in the hydrocarbons of fossil fuels and other hydrocarbon-containing materials are broken by biotreatment with bacillus-type thermophilic and chemolithotrophic microorganisms selected from naturally occurring isolates derived from hot sulfur springs. The breaking of these select chemical bonds facilitates the solubilization of hydrocarbons in fossil fuels and other hydrocarbon-containing materials.

Still other aspects and advantages of the present invention, it will become easily apparent by those skilled in the art from the following detailed description, wherein it is shown and described preferred embodiments of the invention, simply by way of illustration of the best mode contemplated of carrying out the invention. As will be realized, the invention is capable of other and different embodiments, and its several details are capable of modifications in various obvious respects, without departing from the invention. Accordingly, the description is to be regarded as illustrative in nature and not as restrictive.

EXAMPLES

Example 1

In this example, coal from the Pittsburgh seam in Washington County, Pennsylvania was liquefied with reagent α-terpineol. The coal sample was obtained from the Coal Bank at Pennsylvania State University, which provided the following proximate analyses for it; 2.00 wt. % of as-received moisture, 9.25 wt. % of dry ash, 38.63 wt. % of dry volatile matter, and 50.12 wt. % of dry fixed carbon. The particle size of coal sample was about 60 mesh. About 60 grams of reagent was gently added to about 30 grams of the coal sample placed in a Pyrex jar (reactor), thus giving rise to the reagent-to-sample ratio of 2 to 1. The capped, but not tightly sealed, Pyrex jar (reactor) containing the resultant mixture of α-terpineol and coal was maintained at the constant temperature of about 96° C. by immersing it in boiling water in a heated beaker and continually agitated by hand. Without boiling of reagent α-terpineol, the pressure in the Pyrex jar remained at the ambient pressure of slightly less than about $1.01 \times 10^5$ Pascals (1 atm). After about 30 minutes, the mixture in the Pyrex jar (reactor) was filtered and the coal particles retained on the filter were washed with ethanol and dried to a constant weight. On the basis of weight loss, the conversion, i.e., the extent of liquefaction, of the coal sample was determined to be about 68 wt. %.

Example 2

This Example is identical to Example 1 in all aspects except two: After maintaining the temperature at about 96oC, for about 30 minutes as done in Example 1, the Pyrex jar (reactor) containing the coal sample and reagent α-terpineol was placed in a beaker containing silica oil to maintain its temperature at about 135° C. for an additional period of about 30 minutes; the pressure in the Pyrex jar (reactor) remained at the ambient pressure of slightly less than about $1.01 \times 10^5$ Pascals (1 atm). The conversion, i.e., the degree of liquefaction, of the coal sample was determined to be about 70 wt. % instead of about 68 wt. % attained in Example 1.

Example 3

The coal sample used was from the same source with the same proximate analyses as those used in the preceding two examples. About 31 grams of reagent α-terpineol were added to about 31 grams of the coal sample in a Pyrex jar (reactor,), thus giving rise to their ratio of 1 to 1. The experiment (operation) was carried out by maintaining the mixture in the Pyrex jar (reactor) at the temperature of about 96° C. and the ambient pressure of slightly less than about $1.01 \times 10^5$ Pascals (1 atm) for about 30 minutes. The conversion, i.e., the degree of liquefaction, of the coal sample attained was determined to be about 71 wt. % by weighing the sample after filtering, washing, and drying as done in the preceding two examples.

Example 4

This Example is essentially identical to the preceding example, i.e., Example 3, except that about 30 wt. % of reagent α-terpineol was replaced with hexane. This reduced the conversion, i.e., the degree of liquefaction, from about 71 wt. % to about 1.3 wt. %.

Example 5

The source and proximate analyses of coal sample and experimental (operating) conditions in terms of temperature and pressure of this example were the same as those of Example 3. The duration of the experiment (reacting time), however, was reduced from about 30 minutes to about 20 minutes. Moreover, about 30 wt. % of the reagent α-terpineol was replaced with 1-butanol. The coal liquefied was only about 0.30 gram, corresponding to about 1.0 wt. %.

Example 6

This Example is the same as Example 3 in terms of the source and proximate analyses of coal sample and operating temperature, pressure and duration of the experiment (reacting time). The amount of the coal sample used was, however, about 25 grams and the reagent comprised about 24 grams (70 wt. %) of α-terpineol and about 6 grams (30 wt. %) of xylene. The coal liquefied was about 10.0 grams, corresponding to about 40 wt. %.

Example 7

In this example, coal from the Wyodak seam in Campbell County, Wyoming was liquefied with reagent α-terpineol. The coal sample was obtained from the Coal Bank at Pennsylvania State University, which provided the following proximate analyses for it; 26.30 wt. % of as-received moisture, 7.57 wt. % of dry ash, 44.86 wt. % of dry volatile matter, and 47.57 wt. % of dry fixed carbon. The coal sample's particle size was about 20 mesh. About 60 grams of reagent α-terpineol was gently added to about 30 grams of the coal sample placed in a Pyrex jar (reactor), thus giving rise to the reagent-to-sample ratio of about 2 to 1. The capped, but not tightly sealed, Pyrex jar (reactor) containing the resultant mixture of α-terpineol and coal was maintained at the constant temperature of about 96° C. by immersing it in boiling water in a heated beaker and continually agitated by hand. Without boiling of reagent α-terpineol, the pressure in the Pyrex jar (reactor) remained at the ambient pressure of slightly less than about $1.01 \times 10^5$ Pascals (1 atm). After about 30 minutes, the mixture in the Pyrex jar (reactor) was filtered and the coal particles retained on the filter were washed with ethanol and dried to a constant weight. On the basis of weight loss, the conversion, i.e., the degree of liquefaction, of the coal sample was determined to be 75 wt. %.

Example 8

The experiment in this example was carried out under the conditions identical to those of the preceding example except one: About 15 grams of reagent α-terpineol were added, instead of about 60 grams, as done in the preceding example, to about 30 grams of the coal sample, thus attaining the reagent-to-coal ratio of 0.5 to 1. The conversion, i.e., the degree of liquefaction, of the coal sample attained decreased from about 75 wt. %, attained in the preceding example, to about 69 wt. %.

Example 9

In this example, about 3 grams of oil shale from the Greenriver region of Colorado was solubilized with about 9 grams of reagent αterpineol, thus giving rise to the sample-to-reagent ratio of 3 to 1, to extract kerogen (organic matter) and/or bitumen (organic matter) from it. The organic carbon content, including both volatile and fixed carbon, was determined to be about 22.66 wt. % by a certified analysis company. Two experiments with the oil-shale samples, having the particle size of 60 mesh, were carried out under the ambient temperature and pressure of about 25° C. and slightly less than about $1.01 \times 10^5$ Pascals (1 atm), respectively. The weight losses of the samples were determined by weighing after filtering, washing with ethanol, and drying. These losses were about 9 wt. % after about 30 minutes and about 17 wt. % after about 45 minutes. From these weight losses, the conversion, i.e., the degree of extraction, of kerogen (organic matter) and/or bitumen (organic matter) was estimated to be about 40 wt. % for the former and was about 75 wt. % for the latter.

Example 10

This Example duplicated the preceding example with the exception that a single experiment, lasting about 15 minutes, was carried out at the temperature of about 96° C., instead of about 25° C. The weight loss of the oil shale sample was about 12 wt. %, corresponding to the conversion, i.e., the degree of extraction, of kerogen (organic matter) of about 53 wt. %

Example 11

In this example, bitumen (organic matter) in tar sands from Alberta, Canada, was solubilized and extracted with reagent synthetic turpentine, which is of the commercial grade. The tar-sands sample was obtained from Alberta Research Council, which provided the following proximate analyses for it; 84.4 wt. % of dry solids, 11.6 wt. % of dry bitumen, and 4.0 wt. % of as received moisture. About 30 grams of reagent synthetic turpentine were gently added to about 15 grams of the tar-sands sample in a capped, but not tightly sealed, Pyrex jar (reactor,), thus giving rise to the reagent-to-sample ratio of about 2 to 1. This Pyrex jar (reactor), containing the resultant mixture of synthetic turpentine and tar sands, was maintained at the constant temperature of about 96° C. by immersing it in boiling water in a heated beaker and continually agitated by hand. Without boiling of reagent synthetic turpentine, the pressure in the Pyrex jar (reactor) remained at the ambient pressure of slightly less than about $1.01 \times 10^5$ Pascals (1 atm). After about 20 minutes, the mixture in the test tube (reactor) was filtered and the solids (tar sands) retained on the filter were washed with ethanol and dried to a constant weight. On the basis of weight loss, the conversion, i.e., the degree of extraction, of bitumen (organic matter) from the tar-sands sample was determined to be about 100 wt. %.

Example 12

In this example, about 60 grams of the tar-sands sample from the same source with the same proximate analyses as those of the preceding example were extracted by about 60 grams of reagent α-terpineol, instead of the commercial-grade synthetic turpentine, which is rich in α-terpineol. The resultant reagent-to-sample ratio, therefore, was 1 to 1 instead of 2 to 1 as in the preceding example. The experiment (operation) lasted about 30 minutes at the temperature of about 96° C. under the ambient pressure of slightly less than about $1.01 \times 10^5$ Pascals (1 atm). The conversion, i.e., the extent of extraction, of bitumen (organic matter) in the tar-sands sample was determined to be about 100 wt. %.

Example 13

In this example, about 60 grams of the tar-sands sample from the same source with the same proximate analyses as those of the preceding two examples were extracted by about 60 grams of reagent synthetic turpentine, which is of the commercial grade. The resultant reagent-to-sample ratio, therefore, was about 1 to 1. The experiment (operation) was carried out for about 30 minutes at the temperature of about 96° C. under the ambient pressure of slightly less than about $1.01 \times 10^5$ Pascals (1 atm). The conversion, i.e., the degree of extraction, of bitumen (organic matter) in the tar-sands sample was determined to be about 70 wt. %.

Example 14

The experiment (operation) in this example duplicated that in Example 8 in all aspects except that the reagent-to-sample ratio was reduced from about 2 to 1 to about 0.5 to 1: About 60 grams to the tar-sands sample was extracted by about 30 grams of reagent synthetic turpentine, which is of the commercial grade. The conversion, i.e., the degree of extraction, of bitumen (organic matter) decreased from about 100 wt. % attained in Example 9 to about 70 wt. %.

Example 15

The experiment (operation) in this example repeated that of the preceding example with reagent α-terpineol instead of the commercial-grade synthetic turpentine. The conversion, i.e., the degree of extraction, of bitumen (organic matter) in the tar-sands sample was about 70 wt. % as in the preceding example.

Example 16

The experiment (operation) in this example was carried out under the ambient pressure of slightly less than about $1.01 \times 10^5$ Pascals (1 atm) with the tar-sands sample from the same source with the same proximate analyses as those in the preceding examples with tar sands. The reagent used was commercial-grade synthetic turpentine, about 60 grams of which was added to about 60 grams of the tar-sands sample, thus giving rise to the reagent-to-sample ratio of about 1 to 1. The temperature of the sample and reagent was maintained at about 65° C. for about 30 minutes followed by cooling to about 15° C. within about 5 minutes. Subsequently, the tar-sands sample was filtered, washed, dried and weighed. On the basis of weight loss, the conversion, i.e., the degree of extraction, of bitumen (organic matter) in the tar-sands sample was determined to be about 70 wt. %.

Example 17

The experiment (operation) in this example repeated that of the preceding example with reagent α-terpineol instead of reagent synthetic turpentine, which is of the commercial grade. The conversion, i.e., the degree of extraction, of bitumen (organic matter) increased to about 90 wt. % from about 70 wt. % of the preceding examples.

Example 18

In this example, a tar-sands sample, weighing about 30 grams, from the same source with the same proximate analyses as those in Examples 11 through 17, was extracted with the reagent comprising about 20 grams (80 wt. %) of α-terpineol and about 5 grams (20 wt. %) of toluene at the temperature of about 96° C. under the ambient pressure of slightly less than about $1.01 \times 10^5$ Pascals (1 atm). The duration of the experiment (reacting or extracting time) was about 30 minutes. The weigh loss of the sample was about 10.2 grams. From this weigh loss, the conversion, i.e., the degree of extraction, of bitumen (organic matter) was estimated to be about 33 wt. %.

Example 19

Three tar-sands samples, all from the same source with the same proximate analyses as those used in all preceding examples with tar sands were extracted by reagents comprising various amounts of α-terpineol and ethanol at the temperature of about 15° C. under the ambient pressure of slightly less than about $1.0 \times 10^5$ Pascals (1 atm). The duration of each experiment (reacting or extracting time) was about 15 minutes for each tar-sands sample. The first sample was extracted with a mixture comprising about 0 gram (0 wt. %) of α-terpineol and about 15 grams (100 wt. %) of ethanol, i.e., with pure ethanol. The second sample was extracted with a mixture comprising about 7.5 grams (50 wt. %) of α-terpineol and about 7.5 grams (50 wt. %) of ethanol. The third sample was extracted with a mixture comprising about 12 grams (80 wt. %) of α-terpineol and about 3 grams (20 wt. %) of ethanol. The weight losses and the estimated conversions, i.e., the degrees of extraction, of bitumen (organic matter) in the three samples were about 0.2 gram (1.0 wt. %), 0.6 gram (3.0 wt. %) and 0.9 gram (4.5 wt. %), for the first, second and third sample, respectively.

Example 20

Irregular-shaped pellets of commercial-grade asphalt whose average size was about 15 mm were solubilized and extracted with reagent α-terpineol and at the ambient temperature of about 22° C. under the ambient pressure of slightly less than about $1.01 \times 10^5$ Pascals (1 atm). The first sample weighing about 20 grams was solubilized and extracted with about 40 grams of reagent α-terpineol, and the second sample also weighing about 20 grams was solubilized and extracted with about 20 grams of reagent α-terpineol. Both samples were completely dissolved after 30 minutes. These experiments were carried out to simulate the solubilization and extraction of heavy crude oil, which tends to be rich in asphaltenes like asphalt.

Example 21

In this example, bitumen (organic matter) in tar-sands from the same source with the same proximate analyses as those used in all previous examples with tar sands was solubilized and extracted with two varieties of vegetable oils, soybean oil and corn oil. The vegetable oils are completely miscible with turpentine liquid. In the first experiment, a tar-sands sample weighing about 15 grams was blended and agitated continually with about 30 grams of soybean oil for about 20 minutes at the temperature of about 96° C. under the ambient pressure of slightly less than about $1.01 \times 10^5$ Pascals (1 atm). The weight loss was about 0.5 gram from which the conversion, i.e., the degree of extraction, of bitumen (organic matter) in the sample was estimated to be about 3.3 wt. %. In the second experiment, a tar-sands sample weighing about 30 grams was blended and agitated continually with about 60 grams of corn oil for about 30 minutes at the temperature of about 175° C. under the ambient pressure of slightly less than about $1.01 \times 10^5$ Pascals (1 atm). The weight loss was about 4.8 grams from which the conversion, i.e., the degree of extraction, of bitumen (organic matter) in the sample was estimated to be about 12 wt. %.

Example 22

Two tests were performed on Berea sandstone plug core samples to determine the effect of reagent injection on oil recovery from core. The first test was designed to determine the increment oil recovery due to reagent (α-terpineol) injection after a field had already undergone waterflooding to the limit. The selected core contained 9.01 cc's of laboratory oil simulating crude oil. The waterflooding with aqueous solution containing 3.0% of potassium chloride produced 4.6 cc's of oil. Five (5) pore volumes of reagent (α-terpineol) injection produced additional 3.61 cc's of oil, thereby leaving the core with less than 8.0% of oil remaining in the original volume. The second test was designed to represent the increased recovery that could be expected from a virgin reservoir with reagent (α-terpineol) injection. The selected core contained 8.85 cc's of laboratory oil simulating crude oil. Oil production began after approximately 0.5 pore volumes of reagent (α-terpineol) injection, which was continued until 3.5 pore volumes; however, the majority of the oil was recovered after only 2.5 pore volumes of reagent (α-terpineol) injection. A total of 7.94 cc's of laboratory oil was recovered, thereby leaving the core with less than 7.5% of oil remaining in the original volume.

The invention claimed is:

1. A method of extracting hydrocarbon-containing organic matter from a hydrocarbon-containing material, comprising the steps of:
providing a first liquid consisting essentially of a turpentine liquid alone or a combination of a turpentine liquid and a turpentine-miscible second liquid wherein the ratio of said turpentine liquid to said turpentine-miscible liquid is greater than or equal to 1:1;
contacting a hydrocarbon-containing material with said first liquid to form an extraction mixture;
extracting said hydrocarbon material into said turpentine liquid; and
separating said extracted hydrocarbon material from a residual material not extracted.

2. The method of claim 1, wherein said turpentine liquid is selected from the group consisting of: natural turpentine, synthetic turpentine, mineral turpentine, pine oil, α-pinene, β-pinene, α-terpineol, β-terpineol, 3-carene, anethole, dipentene (p-mentha-1,8-diene), terpene resins, nopol, pinane, camphene, p-cymene, anisaldeyde, 2-pinane hydroperoxide, 3,7-dimethyl-1,6-octadiene, isobornyl acetate, terpin hydrate, ocimene, 2-pinanol, dihydromycenol, isoborneol, α-terpineol, alloocimene, alloocimene alcohols, geraniol, 2-methoxy-2,6-dimethyl-7,8-epoxyoctane, camphor, p-menthan-8-ol, α-terpinyl acetate, citral, citronellol, 7-methoxydihydrocitronellal, 10-camphorsulphonic acid, p-methene, p-menthan-8-yl acetate, cintronellal, 7-hydroxydihydrocitronellal, menthol, menthone, polymers thereof, and mixtures thereof.

3. The method of claim 1, wherein said turpentine liquid is selected from the group consisting of natural turpentine, synthetic turpentine, mineral turpentine, pine oil, α-pinene, β-pinene, α-terpineol, β-terpineol, polymers thereof, and mixtures thereof.

4. The method of claim 1, wherein said hydrocarbon-containing material is a solid, semi-solid, liquid or viscous liquid fossil fuel material.

5. The method of claim 4, wherein said solid or semi-solid fossil fuel material is particulate.

6. The method of claim 5, wherein said solid or semi-solid fossil fuel has an average particle size of from about 0.074 millimeters to about 100 millimeters.

7. The method of claim 1, wherein said contacting step further comprises contacting said reaction mixture with a third liquid which is immiscible with said turpentine liquid.

8. The method of claim 1, wherein said second liquid is selected from the group consisting of lower aliphatic alcohols, lower alkanes, lower aromatics, aliphatic amines, aromatic amines, carbon bisulfide, or vegetable oils, and mixtures thereof.

9. The method of claim 8, wherein said second liquid is selected from the group consisting of ethanol, propanol, isopropanol, butanol, pentane, heptane, hexane, benzene, toluene, xylene, anathracene, tetraline, triethylamine, aniline, carbon bisulfide, soybean oil, palm oil, rapeseed oil, corn oil, sunflower oil, and canola oil, and mixtures thereof.

10. The method of claim 7, wherein said liquid immiscible with the turpentine liquid comprises water.

11. The method of claim 10, wherein said water is boiling.

12. The method of claim 4, wherein said solid, semi-solid, liquid or viscous liquid fossil fuel material and said turpentine liquid are contacted at a temperature of from about 2° C. to about 200° C.

13. The method of claim 4, wherein said solid, semi-solid, liquid or viscous liquid fossil fuel material and said turpentine liquid are contacted at a pressure of from about $1.0 \times 10^4$ Pascals (0.1 atm) to about $5.0 \times 10^6$ Pascals (50.0 atm).

14. The method of claim 4, further comprising providing means for contacting said solid, semi-solid, liquid or viscous liquid fossil fuel material and said turpentine liquid in situ in an underground formation containing said fossil fuel material, and for extracting said hydrocarbon material from said formation.

15. The method of claim 4, further comprising a first step of providing a reactor vessel, within which reactor vessel said solid or semi-solid fossil fuel material is contacted with said turpentine liquid; providing a means for agitating said solid or semi-solid fossil fuel material and said turpentine liquid in said reactor vessel; and
agitating said solid or semi-solid fossil fuel material and said turpentine liquid.

16. The method of claim 15, wherein said solid or semi-solid fossil fuel material is contacted by said turpentine liquid at a temperature of less than about 300° C.

17. The method of claim 15, wherein said solid or semi-solid fossil fuel material is contacted by said turpentine liquid at a temperature of less than about 60° C.

18. The method of claim 1, further comprising providing an energy input to said extraction mixture during said contacting, selected from the group consisting of thermal energy in excess of about 250° C., pressure in excess of $20.0 \times 10^5$ Pascals (20 atm), microwave energy, ultrasonic energy, ionizing radiation, mechanical shear-forces, and mixtures thereof.

19. The method of claim 1, further comprising providing to said extraction mixture during said contacting a compound selected from the group consisting of hydrogen, carbon monoxide, water, metal oxides, metals, and mixtures thereof.

20. The method of claim 1, further comprising providing a bacillus-type thermophilic or chemolithotrophic microorganism to said reaction mixture during said contacting.

21. The method of claim 1, wherein said hydrocarbon-containing material is contacted with at least 0.5 pore volume of turpentine liquid.

22. The method of claim 1, wherein said first liquid is α-terpineol or synthetic turpentine.

23. The method of claim 1, wherein said first liquid contains no water.

24. The method of claim 1, wherein said first liquid contains at least about 70% of said turpentine liquid.

25. The method of claim 1, further comprising the step of agitating said extraction mixture during said contacting step.

26. The method of claim 25, wherein said agitation is effected by contacting said reaction mixture with boiling water.

27. The method of claim 26, wherein said reaction mixture is immersed in boiling water.

28. The method of claim 1, wherein said hydrocarbon-containing material is coal, oil shale, tar sands, crude oil, heavy crude oil, or a combination thereof.

29. The method of claim 28, wherein said hydrocarbon-containing material is coal.

30. A method of extracting hydrocarbon-containing organic matter from a hydrocarbon-containing material, comprising the steps of:
providing a hydrocarbon-extracting liquid that is a turpentine liquid or a combination of a turpentine liquid and a turpentine-miscible second liquid;
contacting a hydrocarbon-containing material with said hydrocarbon-extracting liquid to form an extraction mixture;
extracting said hydrocarbon-containing organic matter into said hydrocarbon-extracting liquid; and
separating said extracted hydrocarbon-containing organic matter from a residual material not extracted.

31. A method of extracting hydrocarbon-containing organic matter from a hydrocarbon-containing material, comprising the steps of:
providing a turpentine liquid selected from the group consisting of natural turpentine, synthetic turpentine, mineral turpentine, pine oil, α-pinene, β-pinene, α-terpineol, β-terpineol, 3-carene, anethole, dipentene (p-mentha-1,8-diene), terpene resins, nopol, pinane, camphene, p-cymene, anisaldeyde, 2-pinane hydroperoxide, 3,7-dimethyl-1,6-octadiene, isobornyl acetate, terpin hydrate, ocimene, 2-pinanol, dihydromycenol, isoborneol, α-terpineol, alloocimene, alloocimene alcohols, geraniol, 2-methoxy-2,6-dimethyl-7,8-epoxyoctane, camphor, p-menthan-8-ol, α-terpinyl acetate, citral, citronellol, 7-methoxydihydrocitronellal, 10-camphorsulphonic acid, p-methene, p-menthan-8-yl acetate, cintronellal, 7-hydroxydihydrocitronellal, menthol, menthone, polymers thereof, and mixtures thereof;
contacting a hydrocarbon-containing material with said turpentine liquid form an extraction mixture;
extracting said hydrocarbon material into said turpentine liquid; and
separating said extracted hydrocarbon material from a residual material not extracted.

* * * * *

UNITED STATES PATENT AND TRADEMARK OFFICE
CERTIFICATE OF CORRECTION

PATENT NO. : 8,101,812 B2
APPLICATION NO. : 12/053126
DATED : January 24, 2012
INVENTOR(S) : Liang-tseng Fan et al.

It is certified that error appears in the above-identified patent and that said Letters Patent is hereby corrected as shown below:

Col. 6, line 4, "90 × 105 (90 atm)" should read "90 × $10^5$ (90 atm)"

Col. 8, lines 17-18, please delete "α-terpineol"

Col. 8, line 54, "9.4" should read "9:4"

Col. 10, line 25, "96oC" should read "96°C"

Col. 15, line 40, please delete "α-terpineol"

Signed and Sealed this
Tenth Day of April, 2012

David J. Kappos
*Director of the United States Patent and Trademark Office*